US010150853B2

(12) United States Patent
Feldhues et al.

(10) Patent No.: US 10,150,853 B2
(45) Date of Patent: Dec. 11, 2018

(54) DIPHENYLGUANIDINE-FREE RUBBER MIXTURES CONTAINING SHORT-CHAIN ALKYL ESTERS OF GLYCERIN

(71) Applicant: LANXESS Deutschland GmbH, Cologne (DE)

(72) Inventors: Ulrich Feldhues, Bergisch-Gladbach (DE); Heinz Unterberg, Dormagen (DE); Hermann-Josef Weidenhaupt, Pulheim (DE); Melanie Wiedemeier-Jarad, Dormagen (DE)

(73) Assignee: LANXESS Deutschland GmbH, Cologne (DE)

( * ) Notice: Subject to any disclaimer, the term of this patent is extended or adjusted under 35 U.S.C. 154(b) by 86 days.

(21) Appl. No.: 15/315,510

(22) PCT Filed: Jun. 2, 2015

(86) PCT No.: PCT/EP2015/062294
§ 371 (c)(1),
(2) Date: Dec. 1, 2016

(87) PCT Pub. No.: WO2015/185571
PCT Pub. Date: Dec. 10, 2015

(65) Prior Publication Data
US 2017/0088690 A1 Mar. 30, 2017

(30) Foreign Application Priority Data
Jun. 3, 2014 (EP) ..................................... 14170950

(51) Int. Cl.
| | | |
|---|---|---|
| C08K 5/11 | (2006.01) |
| C08K 3/013 | (2018.01) |
| C08K 5/103 | (2006.01) |
| C08J 3/24 | (2006.01) |
| C08K 3/04 | (2006.01) |
| C08K 3/36 | (2006.01) |
| C08K 5/31 | (2006.01) |
| C08K 5/39 | (2006.01) |
| C08K 5/5419 | (2006.01) |
| C08K 9/02 | (2006.01) |
| C08L 9/06 | (2006.01) |
| C08K 5/3415 | (2006.01) |
| C08K 5/41 | (2006.01) |
| C08L 91/00 | (2006.01) |

(52) U.S. Cl.
CPC . *C08K 5/11* (2013.01); *C08J 3/24* (2013.01); *C08K 3/013* (2018.01); *C08K 3/04* (2013.01); *C08K 3/36* (2013.01); *C08K 5/103* (2013.01); *C08K 5/31* (2013.01); *C08K 5/3415* (2013.01); *C08K 5/39* (2013.01); *C08K 5/41* (2013.01); *C08K 5/5419* (2013.01); *C08K 9/02* (2013.01); *C08L 9/06* (2013.01); *C08L 91/00* (2013.01); *C08J 2309/06* (2013.01); *C08K 2201/019* (2013.01)

(58) Field of Classification Search
CPC ....................................................... C08K 5/11
See application file for complete search history.

(56) References Cited

U.S. PATENT DOCUMENTS

| | | |
|---|---|---|
| 6,753,374 B1 | 6/2004 | Hannon et al. |
| 6,811,722 B2 | 11/2004 | Zhou et al. |
| 7,411,018 B2 | 8/2008 | Appel et al. |
| 7,714,050 B2 | 5/2010 | Hong |
| 9,163,132 B2 | 10/2015 | Nagamori et al. |
| 9,181,417 B2 | 11/2015 | Klmura |
| 9,260,588 B2 | 2/2016 | Darnaud et al. |
| 9,267,014 B2 | 2/2016 | Darnaud et al. |
| 2006/0272760 A1 | 12/2006 | Teratani et al. |
| 2007/0254826 A1* | 11/2007 | Kindel ............... A23F 3/405 512/25 |
| 2010/0048775 A1 | 2/2010 | Mihara et al. |
| 2011/0196071 A1 | 8/2011 | Mentink et al. |
| 2011/0233479 A1 | 9/2011 | Korzhenko et al. |
| 2015/0291782 A1* | 10/2015 | Feldhues ............... B60C 1/00 523/156 |
| 2015/0322241 A1 | 11/2015 | Darnaud et al. |

FOREIGN PATENT DOCUMENTS

| | | | |
|---|---|---|---|
| CN | 101628994 B | 6/2011 | |
| DE | 265221 | 11/1912 | |
| DE | 102010005558 A1 * | 7/2011 | ............. C08K 5/103 |
| EP | 1813310 A2 | 8/2007 | |
| EP | 2246200 A1 | 11/2010 | |
| EP | 2604651 A1 | 6/2013 | |
| FR | 1021959 A | 2/1953 | |
| FR | 2984897 A1 | 8/2014 | |
| GB | 801928 A | 9/1958 | |
| JP | 63039935 A2 | 2/1988 | |
| JP | 2006300131 A2 | 11/2006 | |
| JP | 2007161822 A2 | 6/2007 | |
| JP | 20080274197 A2 | 11/2008 | |
| JP | 2012188537 A2 | 10/2012 | |
| WO | 13104492 A1 | 7/2013 | |

OTHER PUBLICATIONS

English Machine Translation for DE102010005558 (A1) Obtained on Apr. 19, 2018 at http://translationportal.epo.org/emtp/translate/?ACTION=claims-retrieval&COUNTRY=DE&ENGINE=google&FORMAT=d (Year: 2010).*

(Continued)

*Primary Examiner* — Arrie L Reuther

(57) ABSTRACT

The invention relates to substantially diphenylguanidine-free rubber mixtures comprising at least one rubber, one silica-based filler and/or carbon black and short-chain alkyl esters of glycerol, production of these, use and vulcanizates thus obtainable.

19 Claims, No Drawings

(56) References Cited

OTHER PUBLICATIONS

European Search Report from European Application No. 14170950, dated Aug. 8, 2014, two pages.
Röthemeyer and Sommer (Kautschuktechnologie [Rubber technology], Hanser Verlag, Munich, Vienna, 2nd Edition, 2006, ISBN-13: 978-3-446-40480-9, pp. 331-333).

* cited by examiner

DIPHENYLGUANIDINE-FREE RUBBER MIXTURES CONTAINING SHORT-CHAIN ALKYL ESTERS OF GLYCERIN

The invention relates to substantially diphenylguanidine-free rubber mixtures comprising at least one rubber, one silica-based filler and/or carbon black and short-chain alkyl esters of glycerol, production of these and use, and also to the vulcanizates thus obtainable by the vulcanization process, in particular in the form of tyres, parts of tyres or of technical rubber items.

Invention of the vulcanization of natural rubber provided a novel material with unique properties that have contributed substantially to the development of modern technology. At the beginning of the 20th century the accelerating effect of basic organic compounds was discovered.

DRP 265221 discloses that piperidine was used to accelerate vulcanization in natural rubber, and also in synthetically produced rubbers. Piperidine was toxic and volatile and had an unpleasant odour, and the rubber-processing industry therefore sought and used basic alternatives to piperidine.

Other Patent publications describe by way of example aniline and other nitrogen-containing organic compounds such as hexamethylenetetramine and thiocarbanilide as accelerators.

The crosslinking of rubbers with use of sulphur-accelerator systems generally has the advantage that processing properties and product properties can be varied widely by using different accelerators and combinations of these, an example being adjustment of induction period (scorch time) and of reaction rate. "Secondary accelerators" can be added to the rubber mixtures in order to regulate induction time and vulcanization time. Among the best-known secondary accelerators are the guanidine accelerators. They are slow-acting accelerators that can be used to modify scorch time and/or full vulcanization time as required. In rubber mixtures they are used by way of example at 2 phr, based on the active ingredient.

The modulus curve of rubber mixtures using guanidines rises slowly and takes a relatively long time to reach the maximum. If these accelerators are used alone they give a comparatively poor flow time/heating time ratio and lead to fairly severe reversion in the compounded rubber material; they are therefore often used in combinations with primary accelerators such as sulphonamide based accelerators.

These slow-acting accelerators have an important function in the production of fuel-saving silica tyres. They interact with the silanol groups and reduce filler interactions and viscosity. They also counteract the retarding effect of acidic fillers.

One of the most important types of guanidine in the rubber industry is diphenylguanidine (DPG). DPG is widely used. The person skilled in the art is aware that DPG liberates aniline under vulcanization conditions. In the light of this, users concerned about the problems caused by aniline are seeking another secondary accelerator.

Patent disclosures describe various DPG reduced mixtures:

US 2010/0048775, U.S. Pat. Nos. 7,605,201, 6,753,374 and 7,714,050 propose replacing the DPG in silica-based rubber mixtures entirely or to some extent with a specific amine or a thiuram disulphide.

WO 2013/104492 describes a rubber mixture including 0.65 phr of DPG and 2 phr of polyols such as TMP.

FR 2984898 describes mixtures comprising less than 0.45 phr of DPG, and also 0.4 phr of aminoether alcohols (such as 2-(2-aminoethoxy)ethanol).

FR 2984897 describes mixtures comprising less than 0.5 phr of DPG and less than 0.45 phr of ether amines such as 3-(2-ethylhexyloxy)propylamines.

FR 2984895 describes mixtures comprising less than 0.5 phr of DPG and about 3.0 phr of alkali metal hydroxides and/or alkaline earth metal hydroxides.

FR 2984896 describes mixtures comprising less than 0.5 phr of DPG and less than 8 phr of a primary amine such as hexadecylamine.

However, the publications such as US 2010/0048775, U.S. Pat. Nos. 7,605,201, 6,753,374, 7,714,050, WO 2013/104492, FR 2984898, FR 2984897, FR 2984895 and FR 2984896 merely concern a constant, or in some cases prolonged, scorch time.

The use of triacetin in rubber mixtures as "solvent" for cellulose derivatives is described in EP 2604651, but the addition of triacetin and cellulose derivatives here leads to impaired properties of the vulcanizate, in particular abrasion properties.

DE102010005558 moreover describes plasticizer preparations comprising ether thioethers or ester thioethers and comprising triacetin, and polar rubber mixtures based on (H)NBR, CR, etc., comprising the said preparations. The examples revealed a slight improvement of the processing properties of the rubber mixture when triacetin was used, in comparison with the comparative example, but there was attendant impairment of the properties of the vulcanizate.

In particular, the use of triacetin as additive in non-polar types of rubber has not been described, and by virtue of the different solubility parameters also appears to the person skilled in the art to be unlikely to succeed, since compatibility of the components is important in the production of a rubber mixture with good properties. According to Röthemeyer and Sommer (Kautschuktechnologie [Rubber technology], Hanser Verlag, Munich, Vienna, 2nd Edition, 2006, ISBN-13: 978-3-446-40480-9, pp. 331-333) the solubility parameter of rubber and plasticizers can be used to estimate the compatibility of the plasticizer in the rubber. At a first approximation here, the difference of the solubility parameters should be within ±10%. The abovementioned publication states the following solubility parameters for rubbers:

| Rubber | Solubility parameter (MPa)1/2 |
|---|---|
| EPDM (ethylene/propylene/diene rubber) | 16.1 |
| NR (natural rubber) | 16.5 |
| BR (butadiene rubber) | 17.1 |
| SBR (styrene/butadiene rubber) | 17.6 |
| CR (chloroprene rubber) | 19.0 |
| NBR (acrylonitrile-butadiene rubber) | 19.0 |
| Plasticizer | |
| Glycerol triacetate (triacetin) | 22.0* |

*via conversion of the value for triacetin of 10.77 cal/m3 according to EP 1813310 using the factor 1 cal/m3 = 2.0455 MPa.

On the basis of the teaching of Röthemeyer and Sommer, the person skilled in the art will not expect good solubility of triacetin in non-polar rubbers, e.g. in rubbers with a solubility product of no more than 17.6, since the difference of the solubility products is as much as 20%.

The present invention is based on the object of providing substantially diphenylguanidine-free rubber mixtures, where this means mixtures comprising at most 1 phr, preferably less than 0.7 phr, particularly preferably less than 0.4 phr, and very particularly preferably less than 0.1 phr, of diphenylguanidine, where the performance properties, in particular the scorch time (MS-t5), Mooney viscosity, elongation at break, tensile strength, hardness and abrasion are not substantially poorer than those of diphenylguanidine-containing mixtures. The rubber mixtures should particularly preferably include non-polar rubbers. The unit phr means parts by weight based on the content of rubber defined as 100 parts by weight in the rubber mixture.

The intention was, via replacement of the diphenylguanidine, to obtain rubber mixtures which create less toxicological risk and which reduce the aniline emission problem or eliminate that problem at source.

Surprisingly, it has now been found that with use of short-chain alkyl esters of glycerol, at least one rubber and one silica-based filler and/or carbon black it is possible to obtain substantially diphenylguanidine-free rubber mixtures which have excellent scorch times (MS-t5) and improved abrasion values with good Mooney viscosity, Shore A hardness, tensile strength and elongation at break.

Particularly surprisingly, it has been found that use of short-chain alkyl esters of glycerol together with the antireversion agent 1,6-bis(N,N-dibenzylthiocarbamoyldithio) hexane (CAS No. 151900-44-6) gives particularly low loss factors (tan delta 60° C.). The loss factor (tan delta 60° C.) is a value that indicates the rolling resistance. The lower this value, the lower the rolling resistance and with this, in the case of an automobile tyre or a car, the lower the fuel consumption.

The present invention therefore provides substantially diphenylguanidine-free rubber mixtures each comprising at least
a rubber
a silica-based filler and/or carbon black,
a short-chain alkyl ester of glycerol according to formula (I)

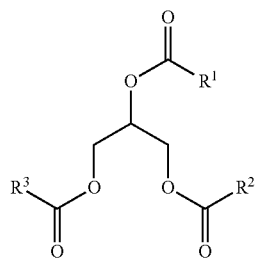

in which
R$^1$, R$^2$, R$^3$ are mutually independently hydrogen or a straight-chain or branched C$_1$-C$_4$-alkyl moiety, preferably a methyl moiety, The present invention further provides a process for the production of substantially diphenylguanidine-free filled rubber mixtures by mixing in each case at least
one rubber
one silica-based filler and/or carbon black,
one short-chain alkyl ester of glycerol according to formula (I)

(I)

in which
R$^1$, R$^2$, R$^3$ are mutually independently hydrogen or a straight-chain or branched C$_1$-C$_4$ alkyl moiety, preferably a methyl moiety,
where the temperature of the material is at least 40° C., preferably in the range from 40 to 200° C., particularly preferably in the range from 80 to 150° C., and then after addition of further vulcanization chemicals carrying out conventional vulcanization. The shear rates during the mixing process are typically in the range from 1 to 1000 sec$^{-1}$, preferably from 1 to 100 sec$^{-1}$. The short-chain alkyl ester glycerol of the formula (I) can be added alone or together with one or more other constituents of the mixture in any desired sequence, again at relatively high temperatures in a range from 80° C. to 200° C., preferably at a temperature of about 150° C.

For the purposes of the invention, rubber mixtures are substantially diphenylguanidine-free as long as the content of diphenylguanidine is ≤1 phr, preferably <0.7 phr, particularly preferably <0.4 phr and very particularly preferably <0.1 phr.

In one preferred embodiment the total content of diphenylguanidine and other guanidine derivatives in the rubber mixtures/vulcanizates is ≤1 phr, preferably <0.7 phr, particularly preferably <0.4 phr and most preferably <0.1 phr.

In one particularly preferred embodiment the rubber mixture of the invention comprises neither diphenylguanidine nor other guanidine derivatives.

The content of cellulose and/or cellulose derivatives, where this in particular means reaction products of cellulose with phenyl isocyanate, n-butyric anhydride, acetic anhydride, butyl isocyanate, stearyl chloride, stearyl isocyanate, butyryl chloride, but preferably cellulose acetate, is typically ≤1 phr, preferably <0.5 phr, particularly preferably <0.1 phr and most preferably 0 phr in the rubber mixtures/vulcanizates of the invention.

The rubber mixture of the invention can be used advantageously not only in zinc-free but also in zinc-containing rubber vulcanizates.

It is preferable to use triacetin as compound of the formula (I).

The rubber mixture of the invention typically comprises from 0.1 to 40 phr, preferably from 0.2 to 20 phr, particularly preferably from 0.5 to 15 phr, very particularly preferably from 1 to 12 phr, more preferably from 2 to 10 phr and most preferably from 3 to 8 phr, of compounds of the formula (I).

Rubber mixtures of the invention and rubber vulcanizates of the invention can also comprise other known rubber additives. It is preferable that at least one anti-reversion agent is present, particularly an anti-reversion agent selected from the group comprising 1,3-bis((3-methyl-2,5-dioxopyrrol-1-yl)methyl)benzene (CAS No. 119462-56-5),hexamethylene 1,6-bis(thiosulphate) in particular in the form of disodium salt dihydrate (CAS-No.: 5719-73-3) and 1,6-bis (N,N-dibenzylthiocarbamoyldithio)hexane (CAS No. 151900-44-6). The anti-reversion agents mentioned can be used individually or in any desired mixture with one another.

In one preferred embodiment, the rubber mixture comprises from 0.1 to 15 phr of the anti-reversion agent 1,6-bis (N,N-dibenzylthiocarbarnoyldithio)hexane (CAS No. 151900-44-6), preferably from 0.1 to 2 phr, particularly preferably from 0.2 to 1.0 phr.

It is preferable in the case of the rubber mixture of the invention that the additive of the formula (I) is added in the first portion of the mixing process when the temperature of the material is by way of example from 100 to 250° C., but it can also be added later at lower temperatures (from 40 to 100° C.), for example together with sulphur and/or accelerator.

In another preferred variant in the case of the rubber mixture of the invention, the additive of the formula (I) and 1,6-bis(N,N-dibenzylthiocarbamoyldithio)hexane (CAS No.: 151900-44-6) are preferably added in the first portion of the mixing process when the temperature of the material is by way of example from 100 to 250° C., but it can also be added later at lower temperatures (from 40 to 100° C.), for example together with sulphur and/or accelerator.

The additives of the formula (I) and/or 1,6-bis(N,N-dibenzylthiocarbamoyldithio)hexane (CAS No.: 151900-44-6) can be used independently of one another either in pure form or else ab- and/or adsorbed on an inert, organic or inorganic or carrier, preferably a carrier selected from the group comprising natural and synthetic silicates, in particular neutral, acidic or basic silica, aluminium oxide, carbon black and zinc oxide.

The additive of the formula (I) can also be added in the form of mixture with 1,6-bis(N,N-dibenzylthiocarbamoyldithio)hexane (CAS No.: 151900-44-6) to the mixing process.

The rubber mixtures of the invention are particularly suitable for the production of tyre treads, subtreads, carcasses and apex mixtures. Tyres/tyre parts here include by way of example treads of Summer, Winter and all-season tyres, and also treads of car tyres and of lorry tyres.

Another aspect of the present invention is provided by vulcanizates obtainable via vulcanization of the rubber mixture of the invention.

The rubber vulcanizates produced are suitable for the production of various rubber products, for example for the production of tyre components in particular for tyre treads, subtreads, carcasses, side walls, reinforced side walk for runflat tyres, apex mixtures, etc., and also for the production of technical rubber items such as damping elements, roll coverings, coverings of conveyor belts, of other belts, of spinning cops, of gaskets, of golf-ball cores, of shoe soles, etc. The rubber products of the invention can in particular provide advantageous operating characteristics to motor vehicles equipped therewith. These motor vehicles are therefore likewise provided by the present invention.

The rubber mixture and rubber vulcanizate of the invention comprise one or more rubbers such as natural rubber (NR) and/or synthetic rubbers. Examples of preferred synthetic rubbers are
BR polybutadiene
ABR butadiene/C1-C4-alkyl acrylate copolymer
CR polychloroprene
IR polyisoprene
SBR styrene/butadiene copolymers having styrene contents of from 1% to 60% by weight, preferably from 20% to 50% by weight
IIR isobutylene/isoprene copolymers
NBR butadiene/acrylonitrile copolymers having acrylonitrile contents of from 5% to 60% by weight, preferably from 10% to 50% by weight
HNBR partially or fully hydrogenated IRR rubber
EPDM ethylene/propylene/diene copolymers
SIBR Styrene/isoprene copolymers
ENR epoxidized natural rubber The rubber mixture of the invention preferably comprises at least one non-polar rubber selected from the group consisting of NR, SBR, BR, IR, SIBR, IIR, ENR and EPDM, preferably from the group consisting of NR, SBR, BR, IR, IIR, ENR and EPDM, more preferably from the group consisting of NR, SBR, BR, IIR and EPDM, particularly preferably from the group consisting of NR, BR and SBR, where the total content of these non-polar rubbers in the rubber mixture is typically at least 50 phr, preferably at least 60 phr and particularly preferably at least 70 phr. In one particularly preferred embodiment the total content of these non-polar rubbers is at least 80 phr, preferably at least 90 phr, more preferably at least 95 phr and particularly preferably at least 99 phr.

The mixtures of the invention can also include polar rubbers, in particular rubbers with a solubility parameter above 17.6. The content of polar rubbers in the form of NBR, HNBR, HXNBR and XNBR in the rubber mixture is typically in each case smaller than 10 phr, preferably smaller than 1.0 phr, particularly preferably smaller than 0.1 phr and very particularly preferably smaller than 0.01 phr.

Silica-Based Filler

The following substances are used as silica-containing fillers for the purposes of this invention:

silica, in particular precipitated silica or fumed silica, produced by way of example by precipitation of solutions of silicates or flame hydrolysis of silicon halides with specific surface areas of from 5 to 1000 $m^2/g$, preferably from 20 to 400 $m^2/g$ (BET surface area) and with primary particle sizes of from 10 to 400 nm. The silicas may optionally also be in the form of mixed oxides with other metal oxides, such as oxides of Al, Mg, Ca, Ba, Zn, Zr, Ti.

synthetic silicates such as aluminium silicate, alkaline earth metal silicates such as magnesium silicate or calcium silicate, with BET surface areas of from 20 to 400 $m^2/g$ and primary particle size of from 10 to 400 nm, natural silicates such as kaolin and other naturally occurring silicas, and mixtures of these substances.

The silicas and silicates mentioned here can also be present in silanized form, obtainable via treatment using chlorosilanes such as monochlorosilane, dichlorosilane, trichlorosilane and tetrachlorosilane, organochlorosilanes such as methyltrichlorosilane, dimethyldichlorosilane, trimethylchlorosilane, ethyltrichlorosilane, diethyldichlorosilane, triethylchlorosilane, and also silanes containing (meth) acryloxy and/or alkoxy groups, for example acryloxypropyltrimethoxysilane, (3-mercaptopropyl) trimethoxysilane, 3-glycidoxypropyltrimethoxysilane, 3-aminopropyltrimethoxysilane, or mono-, di-, tri-, or tetramethoxysilane. Corresponding production processes are stated inter alia in EP 2 033 990 B1.

Carbon Black Filler

In addition to, or as alternatives to, the silica-based fillers it is possible to use carbon blacks, and carbon blacks particularly suitable here are those produced by the lampblack, furnace-black or gas-black process with BET surface areas of from 20 to 200 m²/g, for example SAF, ISAF, IISAF, HAF, FEF, and GPF carbon blacks.

The total content of fillers in the rubber mixture of the invention can in principle be varied as widely as desired. Usual quantities are from 0.1 to 200 phr, preferably from 30 to 150 phr. In one preferred embodiment the content of carbon-black-based fillers is relatively small in comparison with that of silica-based fillers.

Rubber mixtures and rubber vulcanizates of the invention can moreover comprise one or more sulphur-containing silanes and/or one or more crosslinking agents. Sulphur-based or peroxidic crosslinking agents are particularly suitable for this purpose, and particular preference is given here to sulphur-based crosslinking agents.

The rubber mixture of the invention can generally use any desired quantities of what are known as reclaimed rubbers of the type described by way of example in CH101628994.

Sulphur-containing silanes that can preferably be used for the rubber mixture and rubber vulcanizates of the invention are bis(triethoxysilylpropyl) tetrasulphane and the corresponding disulphane, and also 3-(triethoxysilyl)-1-propanethiol, and silanes such as Si 363 from Evonik, Germany or silane NXT/NXT Z from Momentive (previously GE, USA), where the alkoxy moiety is methoxy or ethoxy; quantities used here being from 2 to 20 parts by weight, preferably from 3 to 11 parts by weight, where the calculation is in each case based on 100% of active ingredient and on 100 parts by weight of rubber. However, it is also possible to use mixtures of these sulphur-containing silanes. Liquid sulphur-containing silanes can have been absorbed on a carrier (dry liquid) in order to improve ease of metering and/or dispersibility. Active ingredient content is preferably from 30 to 70 parts by weight, with preference from 40 to 60 parts by weight, per 100 parts by weight of dry liquid.

In one preferred embodiment, the present rubber mixtures comprise from 50 to 100 phr of silica-based filler and from 0.2 to 12 phr of organic slimes, preferably sulphur-containing organic silanes, particularly preferably sulphur-containing organic silanes containing alkoxysilyl groups and very particularly preferably sulphur-containing organic silanes containing trialkoxysilyl groups.

Peroxidic crosslinking agents used are preferably bis(2,4-dichlorobenzyl) peroxide, dibenzoyl peroxide, bis(4-chlorobenzoyl) peroxide, 1,1-bis(t-butylperoxy)-3,3,5-trimethylcyclohexane, tert-butyl perbenzoate, 2,2-bis(t-butylperoxy) butane, 4,4-di-tert-butyl peroxynonyl valerate, dicumyl peroxide, 2,5-dimethyl-2,5-di(tert-butylperoxy)hexane, tert-butyl cumyl peroxide, 1,3-bis(tert-butylperoxyisopropyl) benzene, di-tert-butyl peroxide and 2,5-dimethyl-2,5-di(tert-butylperoxy)-3-hexyne.

Other additions that can also be used with advantage, alongside these peroxidic crosslinking agents, are those that can increase crosslinking yield: examples of compounds suitable for this purpose are triallyl isocyanurate, triallyl cyanurate, trimethylolpropane tri(meth)acrylate, triallyl trimellitate, ethylene glycol di(meth)acrylate, butanediol di(meth)acrylate, trimethylolpropane tri(meth)acrylate, zinc diacrylate, zinc dimethacrylate, 1,2-polybutadiene, and N,N'-m-phenylenedimaleimide.

Sulphur can be used as crosslinking agent in elemental soluble or insoluble form, or in the form of sulphur donors. Examples of sulphur donors that can be used are dimorpholyl disulphide (DTDM), 2-morpholinodithiobenzothiazole (MBSS), caprolactam disulphide, dipentamethylenethiuram tetrasulphide (DPTT), tetramethylthiuram disulphide (TMTD) and tetrabenzylthiuram disulphide (TBzTB). In one preferred embodiment the rubber mixture comprises from 0.1 to 15 phr of TBzTD, preferably from 0.1 to 2 phr, particularly preferably from 0.1 to 0.5 phr.

In principle, the crosslinking of the inventive rubber mixture can be effected with sulphur or sulphur donors alone, or together with vulcanization accelerators, suitable examples of which are dithiocarbamates, thiurams, thiazoles, sulphenamides, xanthogenates, bi- or polycyclic amines, dithiophosphates, caprolactams and thiourea derivatives. Other compounds suitable are moreover zinc diamine diisocyanate, hexamethylenetetramine, 1,3-bis(citraconimidomethyl)benzene, and also cyclic disulphanes. It is preferable that the rubber mixtures of the invention comprise sulphur-based crosslinking agents and vulcanization accelerators.

Particular preference is given to using sulphur, magnesium oxide and/or zinc oxide as crosslinking agents, to which the known vulcanization accelerators are added, examples being mercaptobenzothiazoles, thiazolesulphenamides, thiurams, thiocarbamates, xanthogenates and thiophosphates.

Preferred quantities used of the crosslinking agents and vulcanization accelerators in the rubber mixture of the invention are from 0.1 to 10 phr, particularly preferably from 0.1 to 5 phr.

The rubber mixture and rubber vulcanizate of the invention can comprise other rubber auxiliaries, such as adhesion systems, ageing inhibitors, heat stabilizers, light stabilizers, antioxidants, and in particular antiozonants, flame retardants, processing aids, impact-resistance improvers, plasticizers, tackifiers, blowing agents, dyes, pigments, waxes, extenders, organic acids, retarders, metal oxides, and activators, in particular triethanolamine, polyethylene glycol, hexanetriol, and anti-reversion agents.

The quantities used of these rubber auxiliaries are conventional, depending inter alia on the intended purpose of the vulcanizates. Conventional quantities are from 0.1 to 30 phr.

Preferred ageing inhibitors used are alkylated phenols, styrenated phenol, sterically hindered phenols such as 2,6-di-tert-butylphenol, 2,6-di-tert-butyl-p-cresol (BHT), 2,6-di-tert-butyl-4-ethylphenol, sterically hindered phenols containing ester groups, sterically hindered phenols containing thioether, 2,2'-methylenebis-(4-methyl-6-tert-butylphenol) (BPH), and also sterically hindered thiobisphenols.

If discoloration of the rubber is not important, it is also possible to use aminic ageing inhibitors, e.g. mixtures of diaryl-p-phenylenediamines (DTPD), octylated diphenylamine (ODPA), phenyl-α-naphthylamine (PAN), phenyl-β-naphthylamine (PBN), preferably those based on phenylenediamine, e.g. N-isopropyl-N'-phenyl-p-phenylenediamine, N-1,3-dimethylbutyl-N'-phenyl-p-phenylenediamine (6PPD), N-1,4-dimethylpentyl-N'-phenyl-p-phenylenediamine (7PPD), N,N'-bis(1,4-dimethylpentyl)-p-phenylenediamine (77PD).

Other ageing inhibitors are phosphites such as tris(nonylphenyl) phosphite, polymerized 2,2,4-trimethyl-1,2-dihydroquinoline (IMQ), 2-mercaptobenzimidazole (MBI), methyl-2-mercaptobenzimidazole (MMBI), zinc methylmercaptobenzimidazole (ZMMBI), these mostly being used in combination with above phenolic ageing inhibitors, TMQ, MBI, and MMBI are mainly used for NBR rubbers, where these are vulcanized peroxidically.

Ozone resistance can be improved via antioxidants such as N-1,3-dimethylbutyl-N'-phenyl-p-phenylenediamine (6PPD), N-1,4-dimethylpentyl-N'-phenyl-p-phenylenediamine (7PPD), N,N'-bis(1,4-dimethylpentyl)-p-phenylenediamine (77PD), enol ethers, or cyclic acetals.

Processing aids are intended to act between the rubber particles, and to counteract frictional forces during mixing, plastification, and deformation. Processing auxiliaries which may be present in the inventive rubber mixtures include all the lubricants customary for the processing of plastics, for example hydrocarbons such as oils, paraffins and PE waxes, fatty alcohols having 6 to 20 carbon atoms, ketones, carboxylic acids such as fatty acids and montanic acids, oxidized PE wax, metal salts of carboxylic acids, carboxamides and carboxylic esters, for example with the alcohols ethanol, fatty alcohols, glycerol, ethanediol, pentaerythritol and long-chain carboxylic acids as the acid component.

The rubber mixture composition of the invention can also comprise flame retardants in order to reduce flammability, and to reduce smoke generation during combustion. Examples of compounds used for this purpose are antimony trioxide, phosphoric esters, chloroparaffin, aluminium hydroxide, boron compounds, zinc compounds, molybdenum trioxide, ferrocene, calcium carbonate, and magnesium carbonate.

It is also possible to add other plastics to the rubber mixture of the invention and the rubber vulcanizate of the invention prior to crosslinking, these acting by way of example as polymeric processing aids or as impact modifiers. These plastics are preferably selected from the group consisting of the homo- and copolymers based on ethylene, propylene, butadiene, styrene, vinyl acetate, vinyl chloride, glycidyl acrylate, glycidyl methacrylate, acrylates and methacrylates having alcohol components of branched or unbranched C1 to C10 alcohols, particular preference being given to polyacrylates having identical or different alcohol residues from the group of the C4 to C8 alcohols, especially of butanol, hexanol, octanol and 2-ethylhexanol, polymethylmethacrylate, methyl methacrylate-butyl acrylate copolymers, methyl methacrylate-butyl methacrylate copolymers, ethylene-vinyl acetate copolymers, chlorinated polyethylene, ethylene-propylene copolymers, ethylene-propylene-diene copolymers.

Known adhesion systems are based on resorcinol, formaldehyde and silica, these being known as RFS direct adhesion systems. Any desired quantity of these direct adhesion systems can be used in the rubber mixture of the invention, at any juncture during mixing of material into the rubber mixture of the invention.

Other suitable formaldehyde donors, alongside hexamethylenetetramine, are methylolamine derivatives. A possible improvement of adhesion is achieved by adding, to the known rubber mixtures, components capable of synthetic resin formation, for example phenol and/or amines and aldehydes, or compounds that cleave to give aldehydes. Compounds widely used as resin-forming components in rubber adhesion mixtures are resorcinol and hexamethylenetetramine (HEXA) (GB Patent 801 928, FR Patent 1 021 959), optionally in combination with silica filler (German Auslegeschrift Patent 1 078 320).

The rubber vulcanizate of the invention can for example be used for the production of foams. For this, chemical or physical blowing agents are added thereto. Substances that can be used as chemical blowing agents are any of those known for this purpose, for example azodicarbonamide, p-toluenesulphonyl hydrazide, 4,4'-oxybis(benzenesulphohydrazide),p-toluenesulphonyl semicarbazide, 5-phenyltetrazole, N,N'-dinitrosopentamethylenetetramine, zinc carbonate, or sodium hydrogencarbonate, or else a mixture comprising these substances. Examples of suitable physical blowing agents are carbon dioxide and halogenated hydrocarbons.

The rubber mixtures of the invention are typically vulcanized at temperatures of from 100 to 250° C., preferably from 130 to 180° C., with a prevailing pressure optionally selected in the range from 10 to 200 bar.

The present invention further provides the use of compounds of the formula (I) for the production of the rubber mixtures, vulcanizates and/or rubber products of the invention.

EXAMPLES

The rubber vulcanizates of the invention can by way of example be produced in the following mixing stages:

1st Mixing Stage:
Rubber (e.g. mixture of SBR and BR) is charged in an internal mixer and mixed for about 30 seconds Optional addition of oxidic filler containing hydroxy groups and silane for surface modification (e.g. addition of two thirds of silica and two thirds of silane, mixing for about 60 seconds and further addition of one third of silica and one third of silane, and mixing for about 60 seconds)

Addition of the additive of the formula (I) and optionally addition of carbon black, oil, ageing inhibitors, zinc oxide and antiozonant waxes, and mixing for about 60 seconds.

This mixing procedure can take place at temperatures of from 100 to 170° C., preferably in the region of 150° C.

2nd Mixing Stage:
After completion of the first mixing stage, the mixture is received by a downstream roll mill and shaped to give a sheet, a strip or pellet, and stored at room temperature for 24 hours.

Processing temperatures here are below 60° C.

3rd Mixing Stage:
The third mixing stage comprises further mastication at from 140 to 170° C. preferably at 150° C., for example in a kneader/internal mixer.

4th Mixing Stage:
Addition of additional substances, for example vulcanization accelerators and/or sulphur crosslinking agents, preferably on a roll at low temperatures (<80° C.).

Suitable assemblies for production of the mixture are known per se and nude by way of example rolls, internal mixers, and also mixing extruders.

Production of the Rubber Vulcanizates of the Invention

Vulcanizates were produced from the rubber formulations listed in Table 1 for Examples 1 to 3, and also for the Reference Examples. For this, in each case the respective constituents of Examples 1 to 3, and also of the Reference Examples, were mixed in a multistage mixing process as described below, and the mixtures were than vulcanized to completion at 170° C.

1st Mixing Stage:
BUNA® CB 24 and BUNA® VSL 5025-2 were charged in an internal mixer and mixed for about 30 seconds Addition of two thirds of VULKASIL® S, two thirds of SI® 69, two thirds of additive of the formula (I), mix for about 60 seconds Addition of one third of VULKASIL® S, one third of SI® 69, one third of additive of the formula (I) and TUDALEN 1849 TE, mix for about 60 seconds Addition of CORAX® N 339, EDENOR® C 18 98-100, VULKANOX® 4020/LG, VULKANOX® HS/LG, ROTSIEGEL zinc white and ANTILUX® 654, mix for about 60 seconds.

The temperature for this mixing procedure was 150° C.

2nd Mixing Stage:

After completion of the first mixing stage, the mixture is received by a downstream roll mill and shaped to give a sheet and stored at room temperature for 24 hours.

Processing temperatures here are below 60° C.

3rd Mixing Stage:

The third mixing stage comprised further mastication at 150° C. in a kneader.

4th Mixing Stage:

Addition of the additional substances CHANCEL 90/95 ground sulphur, VULKACIT® CZ/C RHENOGRAN® DPG-80 on a roll at temperatures below 80° C.

The rubber mixtures and vulcanizates produced were subjected to the technical tests stated below. The values determined are likewise shown in Table 2.

Determination of the Properties of Rubber Mixture/Vulcanizates:

Measurement of Mooney Viscosity:

This property was determined by means of a shearing-disc viscometer in accordance with ASTM D1646. The viscosity can be determined directly from the force with which the rubbers (and rubber mixtures) resist processing. In the Mooney shearing disk viscometer, a fluted disk is enclosed, above and below, by test substance and is rotated at about two revolutions per minute in a heatable chamber. The force required here is measured in the form of torque, and corresponds to the respective viscosity. The sample is generally preheated for one minute to 100° C.; the measurement takes a further 4 minutes, the temperature being kept constant here. The viscosity is stated together with the respective test conditions, an example being ML (1+4) 100° C. (Mooney viscosity, large rotor, preheat time and test time in minutes, test temperature).

Scorch Performance (Scorch Time t5):

The same test can moreover be used as described above to measure the scorch performance of a mixture. The selected temperature was 130° C. The rotor runs until, after the torque value has passed through a minimum, it has increased to 5 Mooney units above the minimum value (t5). The greater the value (unit being seconds), the slower the scorch and the greater the reliability of the process.

170° C./t95 Full Vulcanization Time from Rheometer (Vulcameter):

The MDR (moving die rheometer) vulcanization profile and analytical data associated therewith are measured in an MDR 2000 Monsanto rheometer in accordance with ASTM D5289-95. The full vulcanization time determined is the time at which 95% of the rubber has been crosslinked. The selected temperature was 170° C.

Hardness Determination:

The hardness of the rubber mixture of the invention was determined by producing milled sheets of thickness 6 mm from the rubber mixture in accordance with formulations of Table 1.

Specimens of diameter 35 mm were cut out of the milled sheets, and the Shore A hardness of these was determined by using a digital Shore hardness tester (Zwick GmbH & Co. KG, Ulm). The hardness of a rubber vulcanizate provides a first indication of its stiffness.

Dyn. Damping:

Dynamic test methods are used to characterize the deformation behaviour of elastomers under periodically changing loads. An externally applied stress changes the conformation of the polymer chain.

The loss factor tan δ is determined indirectly here by way of the ratio of loss modulus G" to storage modulus G'.

TABLE 1

Rubber formulation
Examples will be used below to illustrate the present invention, which however is not restricted thereto.
Constituents of the rubber preparations of the invention:

|  | Rubber formulation Reference 1 | Rubber formulation Reference 2 | Rubber formulation Example 1 | Rubber formulation Example 2 | Rubber formulation Example 3 |
|---|---|---|---|---|---|
| BUNA CB 24 | 30 | 30 | 30 | 30 | 30 |
| BUNA VSL 5025-2 | 96 | 96 | 96 | 96 | 96 |
| CORAX N 339 | 6.4 | 6.4 | 6.4 | 6.4 | 6.4 |
| VULKASIL S | 80 | 80 | 80 | 80 | 80 |
| TUDALEN 1849-TE | 8 | 8 | 8 | 8 | 8 |
| EDENOR C 18 98-100 | 1 | 1 | 1 | 1 | 1 |
| VULKANOX 4020/LG | 1 | 1 | 1 | 1 | 1 |
| VULKANOX HS/LG | 1 | 1 | 1 | 1 | 1 |
| ROTSIEGEL ZINC WHITE | 2.5 | 2.5 | 2.5 | 2.5 | 2.5 |
| ANTILUX 654 | 1.5 | 1.5 | 1.5 | 1.5 | 1.5 |
| SI 69 | 6.4 | 6.4 | 6.4 | 6.4 | 6.4 |
| VULKACIT CZ/C | 1.5 | 1.5 | 1.5 | 1.5 | 1.5 |
| CHANCEL 90/95 ground sulphur | 1.5 | 1.5 | 1.5 | 1.5 | 1.5 |
| Vulcuren | — | 0.4 | 0.4 | 0.4 | — |
| RHENOGRAN DPG-80 | 2.5 | — | — | — | — |
| Triacetin (additive of the formula (I)) | — | — | 2 | 8 | 8 |

| Trade name | Description | Producer/Marketed by |
|---|---|---|
| BUNA CB 24 | BR | Lanxess Deutschland GmbH |
| BUNA VSL 5025-2 | SBR | Lanxess Deutschland GmbH |

TABLE 1-continued

Rubber formulation
Examples will be used below to illustrate the present
invention, which however is not restricted thereto.
Constituents of the rubber preparations of the invention:

| | | |
|---|---|---|
| CORAX N 339 | Carbon black | Degussa-Evonik GmbH |
| VULKASIL S | Silica | Lanxess Deutschland GmbH |
| RHENOGRAN DPG-80 | Diphenylguanidine | RheinChemie |
| TUDALEN 1849-TE | Mineral oil | Hansen&Rosenthal KG |
| EDENOR C 18 98-100 | Stearic acid | Cognis Deutschland GmbH |
| VULKANOX 4020/LG | N-1,3-Dimethylbutyl-N-phenyl-p-phenylenediamine | Lanxess Deutschland GmbH |
| VULKANOX HS/LG | Polymerized 2,2,4-trimethyl-1,2-dihydroquinoline | Lanxess Deutschland GmbH |
| ROTSIEGEL ZINC WHITE | Zinc oxide | Grillo Zinkoxid GmbH |
| ANTILUX 654 | Light-stabilizer wax | RheinChemie Rheinau GmbH |
| SI 69 | Bis(triethoxysilylpropyl) tetrasulphide | Evonik Industries |
| VULKACIT CZ/C | N-Cyclohexyl-2-benzothiazolesulphenamide | Lanxess Deutschland GmbH |
| Vulcuren | 1,6-bis(N,N'-dibenzylthiocarbamoyldithio)hexane | Lanxess Deutschland GmbH |
| Triacetin | Glycerol triacetate | Lanxess Deutschland GmbH |
| CHANCEL 90/95 GROUND SULPHUR | Sulphur | Solvay Deutschland GmbH |

Quantities stated in phr (parts by weight per 100 parts of rubber)

TABLE 2

Summary of results

| | | Rubber formulation Reference 1 | Rubber formulation Reference 2 | Rubber formulation Example 1 | Rubber formulation Example 2 | Rubber formulation Example 3 |
|---|---|---|---|---|---|---|
| ML 1 + 4 (Mooney viscosity) | MU | 87 | 92 | 89 | 81 | 81 |
| MS-t5 (scorch time) | sec | 1344 | 1435 | 1588 | 2036 | 2998 |
| Full vulcanization time (t95) | s | 1253 | 1167 | 1405 | 1554 | 2030 |
| Average hardness value | Shore A | 70 | 70 | 70 | 72 | 68 |
| Elongation at break | % | 351 | 365 | 359 | 358 | 400 |
| Tensile strength | MPa | 18.9 | 19.8 | 20.0 | 18.8 | 18.8 |
| DIN 53516 abrasion | mm³ | 67 | 60 | 54 | 53 | 44 |
| Loss factor (tan δ (60° C.)) | | 0.134 | 0.123 | 0.130 | 0.122 | 0.137 |

Surprisingly, it has now been found that the rubber mixtures of the invention have significantly longer scorch times (MS-t5) and low Mooney viscosities, and that the vulcanizates obtained therefrom have excellent abrasion values, and also high Shore A hardness, tensile strength, and elongation at break, and low tan δ values (60° C.).

The rubber mixtures of the invention exhibited no dispersion problems. Little or no aniline is liberated during processing.

What is claimed is:
1. A substantially diphenylguanidine-free rubber mixture comprising:
    at least one non-polar rubber selected from the group consisting of natural rubber (NR), styrene/butadiene rubber (SBR), polybutadiene rubber (BR), polyisoprene rubber (IR), isobutylene/isoprene rubber (IIR), epoxidized natural rubber (ENR) and ethylene/propylene/diene rubber EPDM,
    a silica-based filler and/or carbon black,
    a short-chain alkyl ester of glycerol according to formula (I)

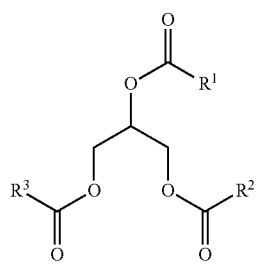

in which $R^1$, $R^2$, and $R^3$ are mutually independently hydrogen or a straight-chain or branched $C_1$-$C_4$-alkyl moiety, and
an anti-reversion agent.

2. The rubber mixture according to claim 1, wherein:
the rubber mixture comprises at most 1 phr of diphenylguanidine; and
the anti-reversion agent is selected from 1,6-bis(N,N-dibenzylthiocarbamoyldithio)hexane (CAS No.: 151900-44-6), 1,3-bis((3-methyl-2,5-dioxopyrrol-1-yl)methyl)benzene (CAS No. 119462-56-5), hexamethylene 1,6-bis(thiosulphate), and mixtures thereof.

3. The rubber mixture according to claim 1, wherein:
the anti-reversion agent comprises 1,6-bis(N,N-dibenzylthiocarbamoyldithio) hexane (CAS No. 151900-44-6); and
the mixture comprises 0.1 to 15 phr of the 1,6-bis(N,N-dibenzylthiocarbamoyldithio) hexane (CAS No. 151900-44-6).

4. The rubber mixture according to claim 1, wherein
the rubber mixture has a total content of, non-polar rubbers of at least 50 phr; and
the rubber mixture has at most 1 phr of diphenylguanidine.

5. The rubber mixture according to claim 1, further comprising polar rubbers, where an individual content of any of butadiene/acrylonitrile rubber (NBR), partially or fully hydrogenated NBR (HNBR), partially or fully hydrogenated carboxylated nitrile butadiene rubber (HXNBR) and carboxylated nitrile butadiene rubber (XNBR) is smaller than 10 phr.

6. The rubber mixture according to claim 1, further comprising at least one crosslinking agent.

7. The rubber mixture according to claim 1, wherein the mixture comprises 0.1 to 40 phr of compounds of the formula (I).

8. The rubber mixture according to claim 1, wherein the mixture comprises 50 to 100 phr of the silica-based filler and 0.2 to 12 phr of organic silanes.

9. The rubber mixture according to claim 1, wherein the compound of the formula (I) is absorbed and/or adsorbed on a carrier selected from the group consisting of natural and synthetic silicates, aluminium oxide, carbon black and zinc oxide.

10. The rubber mixture according to claim 1, wherein the rubber mixture has a cellulose and/or cellulose derivatives content of 0 to ≤1 phr.

11. A process for the production of the rubber mixture according to claim 1, the process comprising mixing the at least one rubber, the silica-based filler and/or carbon black, the short-chain alkyl ester of glycerol according to formula (I), and the anti-reversion agent with one another at a temperature of 40 to 200° C.

12. A process for the production of rubber vulcanizates, the process comprising vulcanizing the rubber mixture according to claim 1 at a temperature of 100 to 250° C.

13. Vulcanizates obtained via vulcanization of rubber mixtures according to claim 1.

14. Rubber products comprising one or more rubber vulcanizates according to claim 13.

15. The rubber mixture according to claim 1, wherein:
the at least one non-polar rubber is selected from the group consisting of NR, SBR and BR;
$R^1$, $R^2$, and $R^3$ are mutually independently hydrogen or methyl; and
the rubber mixture has at most 1 phr of diphenylguanidine.

16. The rubber mixture according to claim 15, wherein the compound of the formula (I) is triacetin.

17. The rubber mixture according to claim 15, wherein the rubber mixture comprises:
a total non-polar rubber content of at least 60 phr,
a content of compounds of the formula (I) of 0.2 to 20 phr, and
0.1 to 2 phr of 1,6-bis(N,N-dibenzylthiocarbamoyl dithio) hexane as the anti-reversion agent.

18. The rubber mixture according to claim 17, further comprising:
polar rubbers, where an individual content of any of butadiene/acrylonitrile rubber (NBR), partially or fully hydrogenated NBR (HNBR), partially or fully hydrogenated carboxylated nitrile butadiene rubber (HXNBR) and carboxylated nitrile butadiene rubber (XNBR) is less than 0.01 phr;
at least one crosslinking agent selected from the group consisting of sulphur, dimorpholyl disulphide (DTDM), 2-morpholinodithiobenzothiazole (MBSS), caprolactam disulphide, dipentamethylenethiuram tetrasulphide (DPTT), tetramethylthiuram disulphide (TMTD) and tetrabenzylthiuram disulphide (TBzTD);
50 to 100 phr of the silica-based filler and 0.2 to 12 phr of sulphur-containing organic silanes; and
a cellulose and/or cellulose derivatives content of 0 to ≤1 phr.

19. The rubber mixture according to claim 15, wherein:
the compound of the formula (I) is triacetin;
the rubber mixture comprises:
at least 70 phr of the non-polar rubbers,
0.2 to 1 phr of 1,6-bis(N,N-dibenzylthiocarbamoyl dithio) hexane;
3 to 8 phr of compounds of the formula (I);
less than 0.1 phr of diphenylguanidines; and
no cellulose and/or cellulose derivatives; and
the compounds of the formula (I) are absorbed and/or adsorbed on a carrier selected from the group comprising natural and synthetic silicates, aluminium oxide, carbon black and zinc oxide.

* * * * *